3,730,730
STABLE AND EMULSIFIABLE HOP EXTRACT
Francis Lloyd Rigby, Yakima, Wash., assignor to John I. Haas Inc., Washington, D.C.
No Drawing. Filed Nov. 23, 1970, Ser. No. 92,267
Int. Cl. C12c 9/02
U.S. Cl. 99—50.5         1 Claim

ABSTRACT OF THE DISCLOSURE

A hop extract composition comprises a resinous phase of the resinous constituents of hops, an aqueous phase of a syrup selected from the group consisting of (1) a syrup of hop water-solubles and (2) a sugar syrup, and a colloid stabilizing agent present in amounts sufficient to inhibit stratification of said phases during storage of said composition at a temperature up to 100° F.

---

This invention relates to the manufacture of hop extracts and particularly to the formulation of an extract which is physically stable and is readily emulsifiable with water.

Several processes are in use for the manufacture of hop extracts. Hops contain a substantial portion of resinous substances including fat-soluble resins, resin acids and essential oils. They contain also some water-soluble constituents such as tannins, sugars, pectins, proteins and minerals. In some conventional extraction processes only the fat-soluble resins, resin acids and essential oils are extracted, using organic solvents such as hexane, methylene chloride or anhydrous methyl alcohol. Other extraction processes use a double extraction process in which the aforementioned resinous substances are extracted in a first extraction with one of the aforementioned organic solvents, followed by a second extraction of the hop fibrous residue with hot water. This water extract which contains the tannins, sugars, pectins, etc. is then concentrated to an aqueous syrup of about 70 to 80%, generally about 75% solids. This syrup is then recombined with the resinous material in any desired proportion.

The brewing value of hop extracts is related mainly to the content of certain resin acids, namely alpha acids, which are extracted with the organic solvent. Some brewers prefer to use only the resinous extract containing these alpha acids but other brewers insist upon the incorporation of the water-soluble extractives of the hop. Regardless of the type preferred by the brewer, the manufacturer is usually required to supply an extract of standardized potency, as measured by its content of alpha acids, and the types of extract now in use in the brewing industry range from approximately 10% alpha acids up to 50% alpha acids. Those manufacturers of extracts which use the double extraction process frequently utilize the water-soluble extractives as a diluent to adjust the potency of the extract formulation to the required alpha acid content. However, some brewers insist upon the absence of the water-soluble extractives but, nevertheless, require an extract of low to medium alpha acid content. This requirement necessitates the addition of an acceptable diluent of non-hop origin. Corn syrup is widely used for this purpose.

As will thus be appreciated, the existence and commercial use of the various types of extracts present certain problems for the brewer. One such problem arises from the fact that the product obtained by mixing the fraction of resinous substance of the hops i.e. that fraction containing the alpha acids, with either the natural syrup of water extractives or with corn syrup, results in an unstable emulsion which stratifies in the container after a period of storage. Consequently, a portion of the extract which is used from the top of a container will differ in composition and potency from the material subsequently taken from the bottom of the container.

Another problem arises when brewers install dispensing equipment which is compatible only with one type of extract. They are thereby prevented from conveniently using other formulations. For example, an extract of the resinous substance type without a diluent remains homogeneous and can be dispensed with certain types of pumping equipment, such as is disclosed in U.S. Pat. 3,478,930. But this pump equipment is not generally useable with formulations which stratify in the container.

Still other brewers use a type of dispensing equipment which involves emulsification of the extract, as supplied by the manufacturer, with one or two volumes of water in a small tank. This emulsion is subsequently dispensed in the appropriate amount into the brew kettle. The success of operating this type of dispensing equipment depends to a large measure on the ability of the hop extract to be dispersed readily in water and form an emulsion which is reasonably stable over a period of a few hours. Those extract formulations which consist of the resinous substances of the hops combined with the water extractives of the hops have properties suitable for this type of dispensing equipment, but extracts of the type consisting of essentially only the resinous substances, or the type, the potency of which has been adjusted by the inclusion therein of corn syrup, will not emulsify satisfactorily in this particular dispensing system. While some degree of emulsification can be obtained with very vigorous agitation, it has been found that the mixture separates very rapidly into a resin layer and an aqueous layer when agitation is discontinued.

To overcome such disadvantages, the present invention provides a hop extract formulation which eliminates two major problems, namely, (1) the stratification of extract formulations in a container; and (2) the failure of some extracts to give a sufficiently stable emulsion when the extract is combined with one or two volumes of water.

It has now been found that the addition of a small amount of a stabilizing colloid to a hop extract formulation, whether it is prepared by mixing an extract of the said resinous substance of the hops with either the hop water-soluble extractives or with a sugar syrup, provides a hop extract of this invention which does not stratify in the container in which it is packaged and stored over a period of one or more years at ambient temperature. It has also been found that this hop extract will readily disperse in water to form a stable emulsion. The effect produced by the presence of the stabilizing colloid can be further enhanced by the addition to the hop extract of a small amount of dibasic phosphate, such as dibasic sodium phosphate or dibasic potassium phosphate. This invention then makes it possible to standardize the potency of the hop extract over a wide range with respect to alpha acid content and the resulting hop extract is found to be compatible with either a pump system of dispensing as exemplified, for instance, in U.S. Pat. 3,478,930, or with the dispensing system involving emulsification of the extract with a small volume of water. Moreover the hop extract of the present invention simplifies the pump dispensing system referred to above by eliminating the necessity of liquifying the extract with heat. The use of a stabilizing colloid in the hop extract permits the incorporation of sufficient water to reduce the viscosity of the formulation to a level where it is sufficiently fluid to be pumped at ambient temperature.

Thus, in accordance with the present invention there is provided a hop extract composition comprising a resinous phase comprising discrete particles, colloidal in size, of the resinous constituents of hops, an aqueous phase comprising water and discrete particles, colloidal in size, of a syrup selected from the group consisting of (1) a syrup of hop water-solubles and (2) a sugar syrup, and a colloid stabilizing agent present in amounts sufficient to inhibit stratification of said phases during storage of said composition at a temperature up to 100° F. inclusive.

The resinous phase of the hop extract composition of this invention includes $\alpha$-acids, $\beta$-acids soft resins ($\alpha$-resin and $\beta$-resin), hard resins ($\gamma$-resins) and hop or essential oil. The amount of resinous phase present in the hop extract composition will be that sufficient to provide in the final hop extract composition an $\alpha$-acid content ranging from about 10–50 weight percent, although it will be recognized that, if desired, an $\alpha$-acid content lower or higher than the above range can also be achieved in accordance with the principles of the present invention. Generally, however, the resinous phase comprises about 25 to 90 weight percent of the hop extract composition of this invention.

The syrup of hop water-solubles comprises water and those hop water-solubles including tannins, pectins, sugars, proteins and minerals which are normally recovered in a water extraction of hops. Generally, the hop water-solubles comprise about 70 to 80 and preferably about 75 weight percent of the syrup of hop water-solubles.

The sugar syrup includes water and a sugar such as sucrose, dextrose, glucose, fructose and their mixtures. Representative syrups include corn syrup, sucrose syrup or a syrup made of a mixture of sucrose (50%) and invert sugar (50%). Generally the sugar syrup will contain 70 to 85 percent solids, the remainder being water.

The colloid stabilizing agent is selected from the group consisting of gelatin, algin and agar and is present in amounts sufficient to stabilize the hop extract composition of this invention to prevent stratification of the resinous and aqueous phase during storage, even for prolonged periods of time, at a temperature up to 100° F., inclusive. The amount of colloid stabilizing agent generally ranges between about 0.25–2 weight percent of the hop extract composition since it has been observed that amounts in excess of about 2 weight percent produce an undesirably viscous extract at low temperatures.

The total amount of water in the water-soluble portion of the extract should not exceed 30 weight percent of the total water-solubles in order to avoid microbial growth. It has been found that the higher water content values reduce the viscosity of the hop extract composition and render it particularly suitable for use in a pump-type dispensing system.

It has also been found that the effect produced by the incorporation of the colloid stabilizing agent is improved by also incorporating a water-soluble dibasic phosphate such as dibasic sodium phosphate and dibasic potassium phosphate. Generally the phosphate will be present in amounts ranging between about 0.2 to 2.0 weight percent based on the total hop extract composition.

The present invention also relates to a method for preparing the hop extract composition which comprises admixing a syrup selected from the group consisting of (1) a syrup of hop water-solubles and (2) a sugar syrup with a colloid stabilizing agent to provide an aqueous phase, and introducing into said aqueous phase with mixing a resinous extract of hops at a temperature ranging between 120–150° F., thereby producing a hop extract composition comprising an essentially homogeneous mixture of discrete particles, colloidal in size, of each said phase.

It has been observed that it is critical to the production of the hop extract composition of this invention to adhere to the mixing sequence described above. Thus, when the syrup is added to a resinous extract of hops, the resulting composition exhibited poor dispersibility characteristics in hot water. Further, it has been found that if the phases are admixed at a temperature exceeding about 150° F., the resulting composition generally is in the form of a molecular dispersion, thus deleteriously affecting its dispersibility properties in hot water. Discrete particles of colloidal size, i.e. about 5–500 millimicrons, of each phase must exist in the hop extract composition of this invention in order for it to exhibit the desired dispersibility characteristics. It has also been found that the lower temperature limit during the blending of the phases is dependent on the viscosity of the composition and the ability of the agitating device or means to achieve an adequate degree of blending. Difficulty in achieving an adequate blending is often encountered if the blending or mixing is carried out at a temperature below about 120° F. The preferred mixing temperature range is between about 130–140° F.

EXAMPLE 1

| Ingredients: | Pounds |
|---|---|
| Corn syrup | 50.8 |
| Gelatin, food grade, 75 bloom | 0.5 |
| Water to wet gelatin | 3.0 |
| Dibasic potassium phosphate | 0.5 |
| Water to dissolve phosphate | 1.0 |
| Hop resin extract, 45.2% alpha acids | 44.2 |

The syrup is introduced into a mixing tank and brought to 130°–140° F. The gelatin is wetted with water, forming a heavy paste which is then promptly put into the syrup by stirring. The phosphate is also dissolved in water and is then aded to the syrup-gelatin mixture and the whole is then stirred slowly until homogeneous. The hop resin extract is then added slowly to the blending tank and the speed of stirring is progressively increased. As stated above, it is essential to add the hop resin extract to the syrup.

The resulting mixture was then poured into a container and allowed to cool to room temperature. The formulation had an alpha acid content of 20.2% by analysis. By means of a probe, samples were withdrawn from the top and from the bottom of the container at monthly intervals for a period of 12 months. These samples from the top and from the bottom of the container were separately analyzed for alpha acid content and showed no significant difference in alpha acid content over the 12 months period.

When one volume of this formulation was added to warm water at 60° C. with stirring, the resulting mixture was a smooth, creamy yellow emulsion which remained stable for one week, at which time the experiment was discontinued.

A pail containing 20 kg. of this formulation was attached to a pump dispenser as described in U.S. Pat. 3,478,930. This formulation pumped readily without any circulation of a heating medium and was accurately metered.

EXAMPLE 2

A syrup is obtained by concentrating the water-soluble components of hops and is used as a diluent. The ingredients of the formulation are as follows:

| Ingredients: | Pounds |
|---|---|
| Hop extract syrup of water solubles, 75% solids | 50.2 |
| Gelatin, food grade, 75 Bloom | 0.5 |
| Water to wet gelatin | 3.0 |
| Dibasic potassium phosphate | 0.5 |
| Water to dissolve phosphate | 1.0 |
| Hop resin extract, 44.7% alpha acids | 44.8 |

The ingredients were combined as described in Example 1 and the product had an alpha acid content of 20.3% by analysis. It did not stratify in a container over a period of 12 months and had dispersibility and pumpable characteristics as described for the product of Example 1.

EXAMPLE 3

The amounts of syrup and hop resin extract were adjusted to yield a product containing 15% alpha acids. The composition was as follows:

| Ingredients: | Pounds |
|---|---|
| Corn syrup | 59.9 |
| Gelatin, food grade, 75 Bloom | 0.5 |
| Water to wet gelatin | 3.0 |
| Dibasic potassium phosphate | 0.5 |
| Water to dissolve phosphate | 1.0 |
| Hop resin extract, 42.8% alpha acids | 35.1 |

The resulting product contained 15.2% alpha acids by analysis. Stability, dispersion and pumpability of the product were completely satisfactory.

EXAMPLE 4

The formulation was essentially the same as in Example 3 except that a syrup of hop water-solubles (75% solids), was used in place of corn syrup. The characteristics of the product were comparable to those in Example 3.

EXAMPLE 5

Example 3 was repeated except that propylene glycol alginate, sold under the trademark Kelcoloid O, was used in corresponding amounts in place of gelatin. Equally favorable results were achieved.

EXAMPLE 6

Example 3 was again repeated except that the syrup was an aqueous solution of a 50–50 mixture of sucrose and invert sugar, 77% solids. Again, equally favorable results were achieved.

EXAMPLE 7

Example was repeated except that agar was employed rather than gelatin and the characteristics of the resulting hop extract composition were comparable to those achieved in Example 3.

What is claimed:

1. A hop extract composition consisting essentially of (a) a resinous phase comprising discrete particles, colloidal in size, of the resinous constituents of hops including α-acids present in amounts sufficient to provide in said hop extract an α-acid content ranging from about 10–50 weight percent of said composition, said resinous phase comprising 25 to 90 weight percent of said composition, (b) an aqueous phase comprising water and discrete particles, colloidal in size, of a syrup selected from the group consisting of (1) a syrup of hop water-solubles wherein said hop water-solubles comprise 70–80 weight percent of said syrup and (2) a sugar syrup, (c) a colloid stabilizing agent selected from the group consisting of gelatin, algin and agar present in amounts of about 0.25–2 weight percent of said composition and (d) a water-soluble dibasic phosphate selected from the group consisting of dibasic sodium phosphate and dibasic potassium phosphate present in amounts ranging from about 0.2 to 2.0 weight percent of said composition.

References Cited

UNITED STATES PATENTS

| | | | |
|---|---|---|---|
| 3,607,298 | 9/1971 | Mitchell et al. | 99—50.5 |
| 3,615,660 | 10/1971 | Bavisotto | 99—50.5 |
| 3,364,265 | 1/1968 | Klingel et al. | 99—50.5 X |
| 2,647,837 | 8/1953 | Salač | 99—50.5 |
| 3,222,181 | 12/1965 | Hoelle et al. | 99—50.5 |

OTHER REFERENCES

Furia, Thomas E.: "Handbook of Food Additives" Chemical Rubber Co., Cleveland, Ohio, 1968, pp. 314, 315, 323, 324, 325, 329, 330, 350, 351.

RAYMOND N. JONES, Primary Examiner